(12) United States Patent
Koch, III

(10) Patent No.: US 7,367,153 B1
(45) Date of Patent: May 6, 2008

(54) COLLAPSIBLE PLANAR BOARD

(76) Inventor: Stanley G Koch, III, 1340 W. Sun Oil Rd., Gladwin, MI (US) 48624

( * ) Notice: Subject to any disclaimer, the term of this patent is extended or adjusted under 35 U.S.C. 154(b) by 47 days.

(21) Appl. No.: 11/378,222

(22) Filed: Mar. 17, 2006

(51) Int. Cl.
*A01K 91/08* (2006.01)

(52) U.S. Cl. .................................................. 43/43.13
(58) Field of Classification Search .............. 43/43.13, 43/9.7; 114/61.15
See application file for complete search history.

(56) References Cited

U.S. PATENT DOCUMENTS

| | | | | |
|---|---|---|---|---|
| 780,029 | A * | 1/1905 | Flegle | 43/43.13 |
| 1,307,623 | A * | 6/1919 | Edmondson | 43/43.13 |
| 1,642,582 | A * | 9/1927 | Hansen | 43/43.13 |
| 1,723,236 | A * | 8/1929 | Hansen | 43/43.13 |
| 1,917,446 | A * | 7/1933 | Hitt | 114/61.15 |
| 2,106,432 | A * | 1/1938 | McIntyre | 114/39.28 |
| 2,119,775 | A * | 6/1938 | Chase | 114/61.15 |
| 2,249,382 | A * | 7/1941 | Henriksen | 43/43.13 |
| 2,273,209 | A * | 2/1942 | Louthan | 43/43.13 |
| 2,327,789 | A * | 8/1943 | Hixon | 43/43.13 |
| 2,351,542 | A * | 6/1944 | Paull | 446/163 |
| 2,487,229 | A * | 11/1949 | Finn | 43/43.13 |
| 2,504,091 | A * | 4/1950 | Scheel | 43/9.7 |
| 2,572,427 | A * | 10/1951 | Anglim | 43/43.13 |
| 2,582,754 | A * | 1/1952 | Kahler | 43/43.13 |
| 2,597,288 | A * | 5/1952 | Caldwell | 43/43.13 |
| 2,707,348 | A * | 5/1955 | Kalder | 43/43.13 |
| 2,797,521 | A * | 7/1957 | Bowen | 43/43.13 |
| 2,923,085 | A * | 2/1960 | Dahl | 43/43.13 |
| 3,044,208 | A * | 7/1962 | Minera | 43/43.13 |
| 3,067,539 | A * | 12/1962 | Black | 43/43.13 |
| 3,142,929 | A * | 8/1964 | Killilea | 43/43.13 |
| 3,225,483 | A * | 12/1965 | Luketa | 43/9.7 |
| 3,269,048 | A * | 8/1966 | Luketa | 43/9.7 |
| 3,410,014 | A * | 11/1968 | Jenssen | 43/9.7 |
| 3,583,089 | A * | 6/1971 | Scarbro | 43/43.13 |
| 3,760,762 | A * | 9/1973 | Spongberg | 43/43.13 |
| 3,818,624 | A * | 6/1974 | Duffy | 43/43.13 |
| 3,823,503 | A * | 7/1974 | Smith | 43/43.13 |
| 3,937,171 | A * | 2/1976 | Seaborn | 114/246 |
| 3,961,590 | A * | 6/1976 | Kefalos | 114/61.19 |
| 3,970,025 | A * | 7/1976 | Sovia et al. | 114/61.19 |

(Continued)

FOREIGN PATENT DOCUMENTS

GB          2272620 A  *  5/1994

*Primary Examiner*—Darren W. Ark
(74) *Attorney, Agent, or Firm*—Robert L. McKellar; McKellar IP Law, PLLC

(57) ABSTRACT

The planar board disclosed features a convexo-concave board characteristic that allows the boards to channel the water creating a water rail for smoother more controlled performance. The planar board also features one removable cross member end that allows for collapsibility quickly and conveniently with out the aid of tools. The collapsibility allows for easy storage. Each board member also features openings therethrough the side of each board which are pressure increasing holes pulling the board in a more defined manor. The distal end of each running board member has a groove that acts as a vacuum release allowing the board to run smoother freeing the board from drag resistance for better performance. Disclosed is a planar board that incorporates collapsibility with convexo-concave characteristic, a vacuum release characteristics and a pressure opening feature giving a faster water displacement response and water rail effect producing a higher riding; smoother performing planar board.

15 Claims, 4 Drawing Sheets

U.S. PATENT DOCUMENTS

| | | | |
|---|---|---|---|
| 3,973,347 A * | 8/1976 | Kearney | 43/43.13 |
| D258,979 S * | 4/1981 | Scola | D22/146 |
| 4,653,213 A * | 3/1987 | May | 43/9.7 |
| 4,703,580 A * | 11/1987 | Kammeraad | 43/43.13 |
| 4,763,437 A * | 8/1988 | Cuda | 43/43.13 |
| 4,879,830 A * | 11/1989 | Quick | 43/9.7 |
| 5,265,367 A * | 11/1993 | Kinoshita | 43/9.7 |
| 5,267,408 A * | 12/1993 | Kinoshita et al. | 43/9.7 |
| 5,341,591 A * | 8/1994 | Hicks | 43/43.13 |
| 5,377,608 A * | 1/1995 | Harper, Jr. | 114/61.15 |
| 5,435,094 A * | 7/1995 | Howard | 43/43.13 |
| 5,548,919 A * | 8/1996 | Hicks | 43/43.13 |
| 5,875,583 A * | 3/1999 | Church | 43/43.13 |
| 6,546,885 B1 * | 4/2003 | Francke | 114/61.15 |
| 6,658,784 B1 * | 12/2003 | Mastropaolo | 43/43.13 |
| 6,789,350 B1 * | 9/2004 | Link | 43/43.13 |
| 2003/0033967 A1 * | 2/2003 | Hayman, III | 114/61.15 |
| 2006/0168874 A1 * | 8/2006 | Hull | 43/43.13 |

\* cited by examiner

COLLAPSIBLE PLANAR BOARD

The present invention deals with a planar board that incorporates collapsibility with convex-concave characteristics, a vacuum release characteristic and a pressure opening feature, providing a faster water displacement response and water rail effect that produces a higher riding; smoother performing planar board.

BACKGROUND OF INVENTION

Planar boards are not new to the art. They are referred to by a multitude of names, namely, trollers, planar boards, outriggers, floats, but all these devices attempt to accomplish similar tasks. After the planar board is attached to a towline it is towed by a boat where fishing lines are detachably connected to the towline that is attached to the planar board. As the planar board moves away from the boat it allows the other lines to get outside of the wake of the boat increasing the quality of fishing and the ability to fish over a greater area. Also this enhances the use of multiple lines without entanglement.

U.S. Pat. No. 780,029 issued to Flegle on Jan. 17, 1905, discloses a trolling float that has a tapered body and fin like projections for pulling behind a boat and attaching additional fishing lines thereto.

U.S. Pat. No. 2,797,521 issued to Bowen on Feb. 3, 1956 discloses a fishing line attachment designed to prevent line entanglement.

U.S. Pat. No. 3,142,929 issued to Killilea Apr. 11, 1962 discloses an outrigger float for fishing. The device is a pair of parallel buoyant runners rigidly connected for towing additional fishing lines. The major differences between Killilea and the instant invention is the fact that the running boards in the instant invention are not equally parallel but offset in a manner that gives added force against the water. Also the inside surface of the running board members are concave to channel the water properly. The cross members of the current invention also collapse when the center or diagonal cross member is pulled out and placed to the side. The whole device folds flat for easier handling and transportation.

U.S. Pat. No. 3,818,624 issued to Duffy Jun. 25, 1974 discloses a horizontal planar board with a weighted adjustable keel. This bears little resemblance to the instant invention. The instant invention uses a pair of running board members that in themselves act as a keel.

U.S. Pat. No. 4,703,580 issued to Kammeraad Nov. 3, 1987 discloses a collapsible planar board that depends upon a system of brackets and a brace to make the device collapsible. The instant device has two cross members that are straight shafts with a curve at each end of approximately 90° that has ratchets or are knurled. This makes the ends of the cross members permanently attached to the planar boards. These curved ends are placed within the openings in the top surface of the running board members. One end of the diagonal member is insertable and is removed from the opening in the top surface allowing the device to collapse without any brackets or slidable parts and all cross members stay attached to the running board members at all times limiting the possibility of lost parts.

U.S. Pat. No. 5,341,591 issued to Hicks Aug. 30, 1994 discloses a planar board with a series of three members that are collapsible. This prior art uses a pivoting arm that allows the boards to lay flat against each other but does not allow them to lay within the same defined plane, meaning that they are longer when they are collapsed than when they are deployed. This makes that device narrower, but longer, making it harder to store and less efficient than the instant invention that allows for the members to collapse into the same plane. Not only are they much more narrower when collapsed, all members align essentially at the same length. None of the prior art devices has the features and abilities of the instant device that is supported in the claims and specification of this application.

THE INVENTION

The invention is a collapsible planar board comprising in combination two boards wherein each board has an inside surface, an outside surface, a near end, a distal end, a top surface, a bottom edge, and a center portion. Each board has at least one angled opening from the outside surface to the inside surface. The inside surface of each board is concave and the outside surface of each board is convex. The near end of each board has an angled water displacement surface. Each board has three cavities in the top surface where two such cavities in each board laying adjacent to each other and located near the near end, and the third cavity being located distant from the two cavities and near the center portion.

There are two cross support members, each has two angled ends, each positioned such that they cross from one board to the other board, wherein one end of one support member inserts into the cavity near the center portion of a first board and the opposite end inserts into the cavity that is nearest to the distal end in the second board. The second support member has one end inserted into the cavity nearest the near end of the second board and inserted into the cavity near the center portion of the first board. A diagonal cross support member has two angled ends, one such end is inserted into the open cavity in the first board and the opposite end is detachedly inserted into the open cavity in the second board. The first board has an anchor point situated near the top surface and essentially centered between the two cross support members.

DETAILED DESCRIPTION OF THE DRAWINGS

Figure 1:
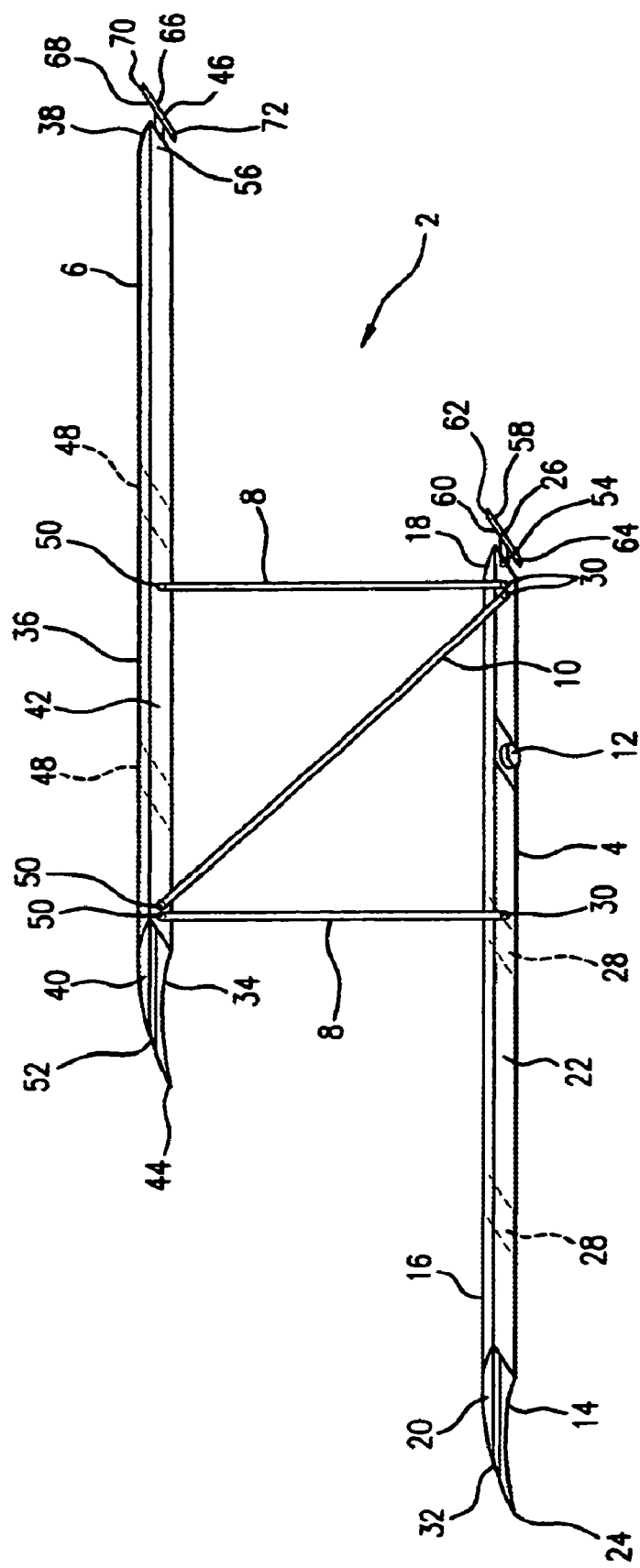
FIG. 1 is a full top view of the planar board with cross members deployed

With reference to FIG. 1 which represents a full top view of the planar board 2, shows the cross members 8 and diagonal cross member 10, deployed. The first running board member 4 is manufactured from a material selected from a group consisting of metal, wood and plastic and has an inside surface 14 and an outside surface 16. Also present on the first running board member 4 is the near end 18, distal end 20 and the top surface 22. The near end 18 has a forerunner 26 attached to it, which feature is optionally with the instant planar boards. The distal end 20 has a groove 32 that acts as a vacuum release allowing the planar board 2 to pass through the water better. The groove 32 is nearly as long as the length of the end of the board. The top surface 22 has the attachment member 12 secured to it, this feature is how the planar board is attached to a tow line and pulled by the watercraft using the device. This attachment member 12 can take on many forms including a snap swivel, ring, imbedded attachment point and any other device for anchoring a tow line and is attached to the planar board or a suitable attachment mechanism. The top surface 22 is also where the cross members 8 and diagonal cross member 10 are attached. These cross members 8 and diagonal cross member 10 connect the first running board member 4 to the second running board member 6. There are two different kinds of cross members, those being a collapsible cross member 8 and the diagonal cross member 10, both of which can be manufactured from a material selected from a group consisting of metal, wood, plastic, graphite and composites. The collapsible cross members 8 are anchored within the top surface 22 at the openings 30 of the first running board member 4 and the top surface 42 at the openings 50 of the second running board member 6. With these two collapsible cross members 8 deployed the planar board is still collapsible, it will fold closed or remain open by deploying and retracting the collapsible cross members 8. With the deployment of the diagonal cross member 10 the planar board 2 is no longer collapsible. Only by removing one end of the diagonal cross member 10 does the device become collapsible. When the one end is removed it simply lies outside the plane of the board member but remaining attached at the opposite end. So all you have to do is pop the end out and collapse the planar boards or open the boards up and insert the diagonal cross member 10 into place securing the planar board 2 in the deployed position.

The top surface 22 of running board member 4 is much wider than the bottom edge 24. The bottom edge 24 has a water displacement characteristic that allows the planar board 2 to more effectively cut the water when being towed. Also featured in the first running board member 4 are at least one angled opening 28 therethrough. The at least one angled opening 28 extends from the outside surface 16 to the inside surface 14 and is angled at an angle such that an outside opening thereof is forward of an inside opening thereof, wherein the angle is from 30° to 60°, 40° to 50°, and more preferably 45°from a linear axis of the planar board. These openings 28 increase the pressure against the inside surface of the first running board member 4 making the planar board 2 pull tighter against the tow line of the watercraft that is towing it. This feature keeps the planar board 2 in a constant state of force against the tow line creating smoother performance even in rougher seas. Basically, this feature prevents the planar board 2 from diving under the surface of the water when being towed.

The second running board member 6 is manufactured from a material selected from a group consisting of metal, wood and plastic and has an inside surface 34 and an outside surface 36. Also present on the second running board member 6 is the near end 38, distal end 40 and the top surface 42. The near end 38 has a forerunner 46 attached to it. The distal end 40 has a groove 52 that acts as a vacuum release allowing the planar board 2 to pass through the water with less drag. The top surface 42 is also where the cross members 8 and diagonal cross member 10 are attached. These cross members 8 and diagonal cross member 10 connect the first running board member 4 to the second running board member 6. The top surface 42 of running board 6 is much wider than the bottom edge 44. The bottom edge 44 has a water displacement characteristic to allow the planar board 2 to cut the water more effectively when being towed. Also featured in the second running board member 6 are at least one angled opening 48 therethrough. The at least one angled opening 28 extends from the outside surface 16 to the inside surface 14 and is angled at an angle such that an outside opening thereof is forward of an inside opening thereof, wherein the angle is from 30° to 60°, 40° to 50°, and more preferably 45° from a linear axis of the planar board. These openings 48 increase the pressure against the inside surface 34 of the second running board member 6 making the planar board 2 pull tighter against the tow line from the towing watercraft. This feature keeps the planar board 2 in a constant state of force against the tow line creating smoother performance even in rougher seas. Basically, this feature prevents the planar board 2 from diving under the surface of the water when being towed.

Attached to the near end 18 of the first running board member 4 is the forerunner 26. The forerunner 26 has at least one attachment point; in this embodiment the forerunner 26 has two attachment points 54. The forerunner 26 has a near end 58 and a distal end 60 which is where it attaches to the first running board member 4. The purpose for the forerunner 26 is to break the plane in the water allowing the first running board member 4 to move ahead easier. This forerunner 26 has a top edge 62 and a bottom edge 64.

Attached to the near end 38 of the second running board member 6 is the forerunner 46. The forerunner 46 has at least one attachment point; in this embodiment the forerunner 46 has two attachment points 56. The forerunner 46 has a near end 66 and a distal end 68 which is where it attaches to the first running board member 6. The purpose for the forerunner 46 is to break the plane in the water allowing the second running board member 6 to move ahead easier. This forerunner 46 has a top edge 70 and a bottom edge 72.

Figure 2:
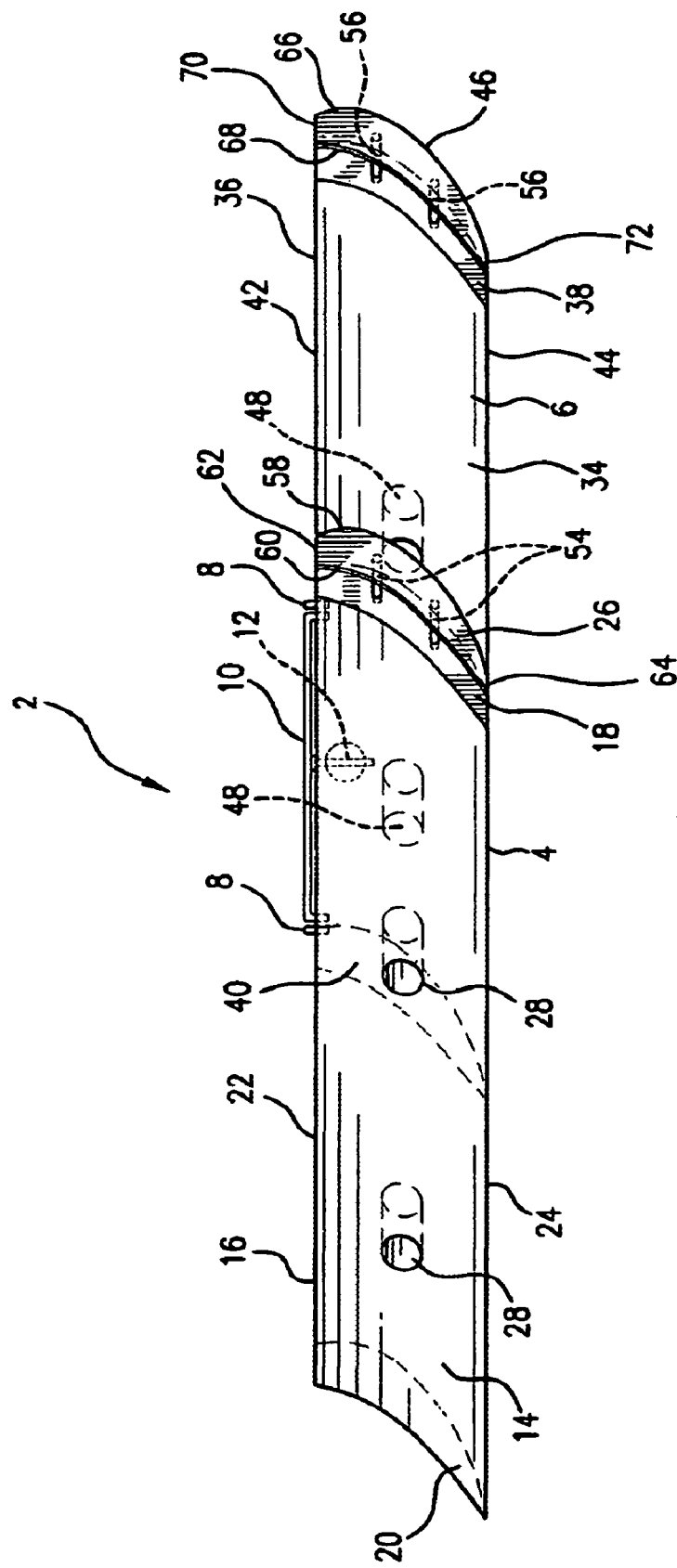
FIG. 2 is a full side view of the planar board with the second running board member 6 shown partially in phantom.

Turning now to FIG. 2, which is a full side view of the planar board 2 with the second running board member 6 shown partially in phantom wherein like numbers as in FIG. 1 feature the same components.

The first running board member 4 has a near end 18, a distal end 20 and the attachment member 12. The second running board member 6 also has a near end 38 and a distal end 40 (shown in phantom). These two running board members 4 and 6 are connected by the collapsible cross members 8 and the diagonal cross member 10. Each of the running board members 4 and 6 have openings 30 and 50 respectively in top surfaces 22 and 42 for the engagement of the cross members 8 and diagonal cross member 10. The collapsible cross members 8 and the diagonal cross member 10 each have angled ends insertable into the openings 30 and 50, wherein the angled ends may be knurled or comprise ring shanks to assist in retaining the members 8 and 10 in the openings 30 and 50.

The first running board member 4 has an inside surface 14 that is concave to channel the water that pass by it more effectively. The outside surface 16 of the first running board member 4 it convex, this too is to help channel the water that is passing by the bottom edge 24. The convexo-concave relationship creates a situation where a water rail is created lifting the planar board up out of the water higher than a regular planar board giving it superior performance while under tow and to maximize the tension on the tow line. The forerunner 26 complements this effect by breaking a path through the water prior to the first running board members 4 arrival. The openings therethrough 28 of the first running board member 4 provide increased pressure driving the board against the tow line allowing it to remain taught.

The second running board member 6 has an inside surface 34 that is concave to channel the water that passes by it more effectively. The outside surface 36 of the second running board member 6 it convex, this too is to help channel the water that is passing by the bottom edge 44. The convexo-concave relationship creates a situation where a water rail is created lifting the planar board 2 up out of the water higher than a regular planar board giving it superior performance while under tow and to maximize tension by the tow line. The forerunner 46 complements this effect by breaking a path through the water prior to the second running board members 6 arrival. The openings therethrough 48 (one is shown in phantom) of the second running board member 6 provide increased pressure driving the board against the tow line allowing it to remain taught. When the diagonal cross member is deployed the running boards 4 and 6 work in conjunction with each other creating the effect of the planar board 2.

Each running board member 4 and 6 has a fore runner 26 and 46. These forerunners 26 and 46 break the plane of the water therefore lowering the resistance on the running board members 4 and 6. From the perspective of FIG. 2 this embodiment shows two attachment points 54 and 56 for each forerunner 26 and 46. This perspective also shows the components of each forerunner 26 and 46 clearer. The forerunner 26 has a near end 58, a distal end 60, a top edge 62 and a bottom edge 64. The forerunner 46 has a near end 66, a distal end 68, a top edge 70 and a bottom edge 72.

Figure 3:
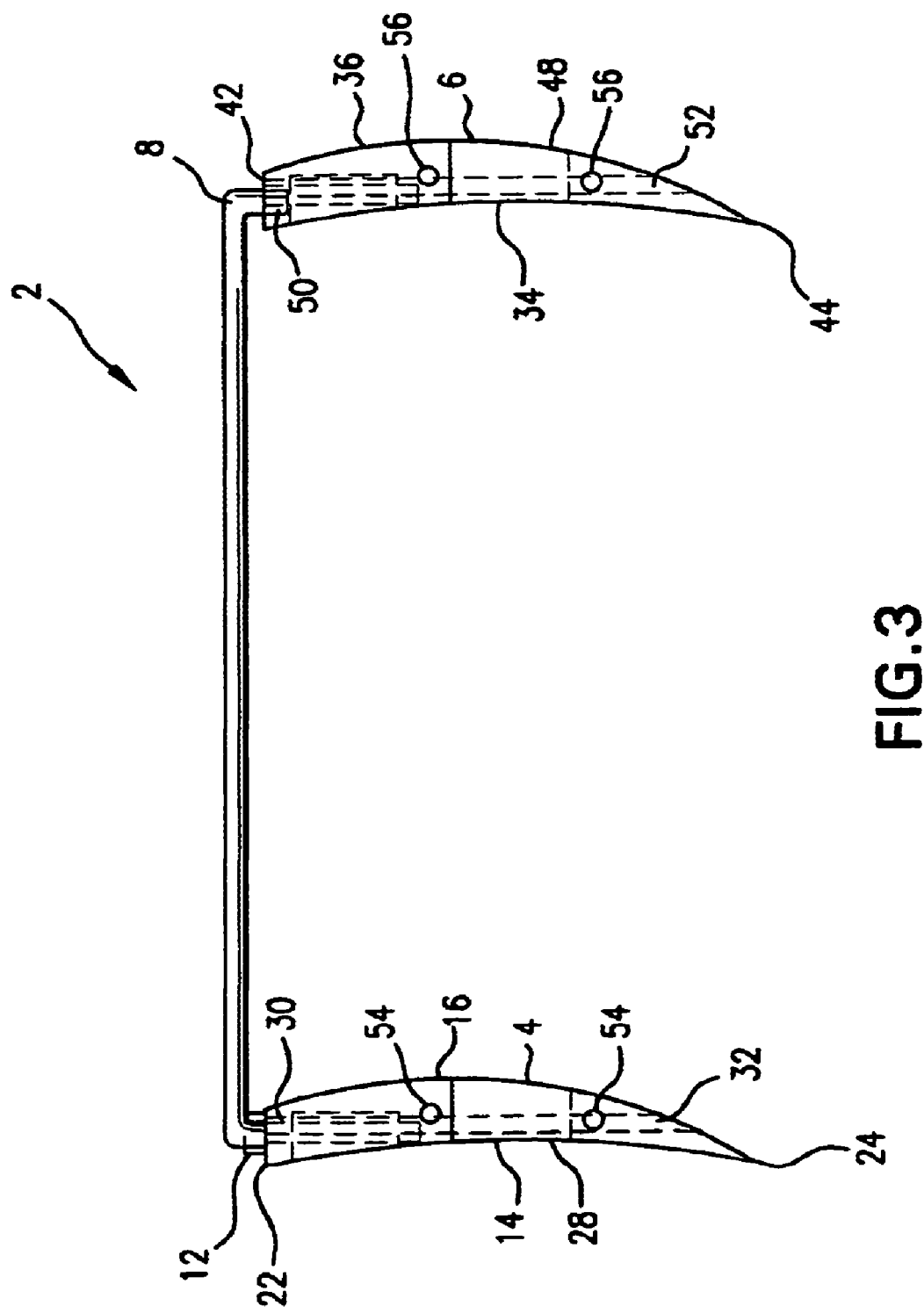
FIG. 3 is a full front end view of the planar board

FIG. 3 is a full front end view of the planar board 2. This perspective clearly shows the first running board member 4 and it's inside surface 14 being concave and the outside surface 16 being convex. It also shows the distinction between the top surface 22 of the first running board member 4 and the bottom edge 24. Also visible are the attachment points 54 and the opening therethrough 28. Also shown in phantom is the groove 32 or anti vacuum groove in the first running board member 4. Also visible is the attachment member 12 in the top surface 22 of the first running board member 4.

This perspective clearly shows the second running board member 6 and it's inside surface 34 being concave and the outside surface 36 being convex. It also shows the distinction between the top surface 42 of the second running board member 6 and the bottom edge 44. Also visible are the attachment points 56 and the opening therethrough 48. Also shown in phantom is the groove 52 or anti vacuum groove in the second running board member 6.

The pair of running boards 4 and 6 is connected via the cross members 8 and diagonal cross member 10. Here only one collapsible cross member 8 is visible. However, the openings 30 and 50 in each respective running boards 4 and 6 top surfaces 22 and 42 are clearly visible.

Figure 4:
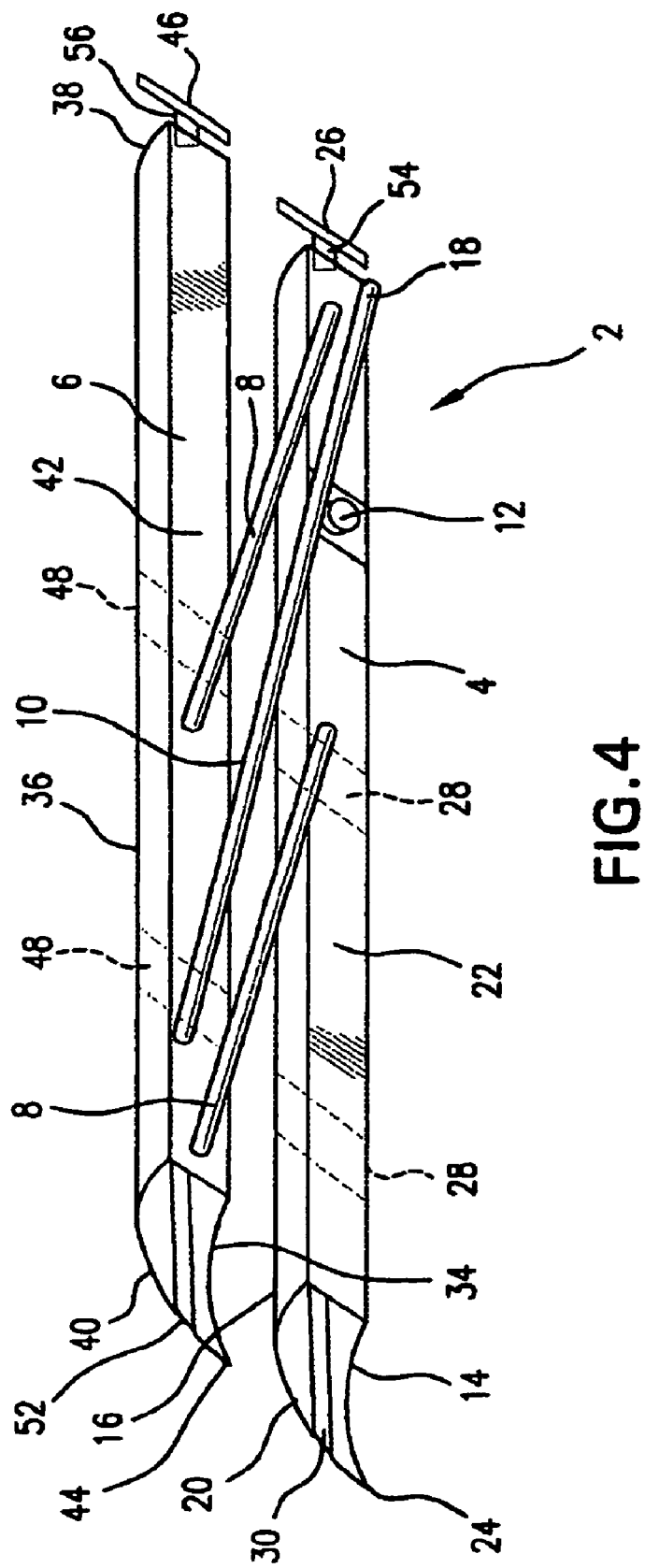
FIG. 4 is a full top view of the planar board with the cross members retracted and boards collapsed.

FIG. 4 is a full top view of the planar board 2 with the cross members 8 and diagonal cross member 10 retracted and planar board 2 collapsed. With the diagonal cross member 10 removed from its opening 30 in the top surface 22 and the collapsible cross members 8 folded inward the planar board 2 is collapsed for storage or stowage. When collapsed the first running board member 4 will come to rest against the second running board member 6. With the outside surface 16 of the first running board member 4 being convex and the inside surface 34 of the second running board member 6 concave they compliment each other and fit together nicely. Other features of the first running member 4 visible include the inside surface 14, the near end 18 and the distal end 20. Attached to top surface 22 of the first running member 4 is the attachment member 12. The bottom edge 24 and the groove 32 are present, as well as, the openings therethrough 28 (shown in phantom). The forerunner 26 of the first running board member 4 is also visible.

The second running board member 6 when collapsed will fold against the first running board member 4.

What is claimed is:

1. A planar board comprising in combination:

two boards, each of said two boards having an inside surface, an outside surface, a near end, a distal end, a top surface, a bottom edge, and a center portion, each of said two boards having at least one angled opening from the outside surface to the inside surface, the inside surface of each of said two boards being concave and the outside surface of each of said two boards being convex, the near end of each of said two boards being an angled water displacement surface;

one of said two boards having three cavities in the top surface, two of said three cavities in said one of said two boards laying adjacent to each other and located near the near end, and a third cavity of said three cavities being located distant from the two cavities and near the center portion thereof;

the other of said two boards having three cavities in the top surface, two of said three cavities in the other of said two boards laying adjacent to each other and located near the distal end, and a third cavity of said three cavities being located distant from the two cavities and near the center portion thereof;

two cross support members, each of said two cross support members having two angled ends, each of said two cross support members positioned such that they cross from the one of said two boards to the other of said two boards, wherein one of said two angled ends of one of said two cross support members inserts into the third cavity near the center portion of the one of said two boards, and the opposite end of said two angled ends inserts into one of the two cavities that is nearest to the distal end in the other of said two boards, and the other of said two cross support members has one of said two angled ends inserted into one of the two cavities nearest the near end of the one of said two boards and the opposite end of said two angled ends is inserted into the third cavity near the center portion of the other of said two boards;

a diagonal cross support member, said diagonal cross support member having two angled ends, one of said two angled ends is inserted into the other of the two cavities located near the near end in the one of said two boards and the opposite end of said two angle ends is detachedly inserted into the other of the two cavities located near the distal end in the other of said two boards;

the one of said two boards having an anchor point situated near the top surface and being centered between the two cross support members.

2. The planar board as claimed in claim 1 wherein the planar board is collapsible.

3. The planar board as claimed in claim 1 wherein the planar board can be assembled or dissembled without the aid of tools.

4. The planar board as claimed in claim 1 wherein the near end of each of said two planar boards further comprises a forerunner attached thereto.

5. The planar board as claimed in claim 4 wherein each of said forerunners has at least one attachment point.

6. The planar board as claimed in claim 1 wherein the distal end of each of said two planar boards is grooved along a length of the distal end.

7. The planar board as claimed in claim 1 wherein the near end of each of said two planar boards further comprises a forerunner attached thereto and the distal end of each of said two planar boards is grooved along a length of the distal end.

8. The planar board as claimed in claim 1 wherein the at least one angled opening from the outside surface to the inside surface is angled at an angle such that an outside opening thereof is forward of an inside opening thereof.

9. The planar board as claimed in claim 8 wherein the angle is from 30° to 60° from a lineal axis of each of said two planar boards.

10. The planar board as claimed in claim 9 wherein the angle is from 40° to 50° from a lineal axis of each of said two planar boards.

11. The planar board as claimed in claim 10 wherein the angle is 45°.

12. The planar board as claimed in claim 1 wherein each of said two boards is manufactured from material selected from a group consisting of metal, wood and plastic.

13. The planar board as claimed in claim 1 wherein said cross members are manufactured from material selected from the group consisting of metal, wood, plastic, graphite and composites.

14. The planar board as claimed in claim 1 wherein said angled ends of said cross members are knurled.

15. The planar board as claimed in claim 1 wherein said angled ends of said cross members are ring shanks.

* * * * *